(12) United States Patent
Boal et al.

(10) Patent No.: US 10,572,899 B2
(45) Date of Patent: Feb. 25, 2020

(54) TRANSMITTING VALID COUPON OFFERS TO AN EMAIL RECIPIENT

(71) Applicant: Quotient Technology Inc., Mountain View, CA (US)

(72) Inventors: Steven Boal, Los Altos, CA (US); Bruce Sattley, San Ramon, CA (US); Vivek Gupta, Mountain View, CA (US)

(73) Assignee: Quotient Technology Inc., Mountain View, CA (US)

( * ) Notice: Subject to any disclaimer, the term of this patent is extended or adjusted under 35 U.S.C. 154(b) by 0 days.

(21) Appl. No.: 16/411,493

(22) Filed: May 14, 2019

(65) Prior Publication Data

US 2019/0266637 A1 Aug. 29, 2019

Related U.S. Application Data (63) Continuation of application No. 14/788,385, filed on Jun. 30, 2015, now Pat. No. 10,339,566.

(51) Int. Cl.
*G06Q 30/00* (2012.01)
*G06Q 30/02* (2012.01)

(52) U.S. Cl.
CPC ..... *G06Q 30/0257* (2013.01); *G06Q 30/0185* (2013.01); *G06Q 30/0241* (2013.01)

(58) Field of Classification Search
None
See application file for complete search history.

(56) References Cited

U.S. PATENT DOCUMENTS

| | | | |
|---|---|---|---|
| 2005/0134450 A1 | 6/2005 | Kovach | |
| 2012/0042025 A1* | 2/2012 | Jamison | G06Q 10/107 709/206 |
| 2014/0379495 A1* | 12/2014 | Fielder | G06Q 30/0277 705/14.73 |
| 2015/0134450 A1* | 5/2015 | Castelli | G06Q 30/0255 705/14.53 |
| 2017/0004533 A1 | 1/2017 | Boal | |

OTHER PUBLICATIONS

Boal, U.S. Appl. No. 14/788,385, filed Jun. 30, 2015, Notice of Allowance dated Feb. 14, 2019.
Boal, U.S. Appl. No. 14/788,385, filed Jun. 30, 2015, Office Action dated Jun. 20, 2018.

* cited by examiner

*Primary Examiner* — Michael W Schmucker
(74) *Attorney, Agent, or Firm* — Hickman Palermo Becker Bingham LLP (57) ABSTRACT

An email server sends an email message to a user with an empty container. When the user uses an email client to open the email message, the email client transmits pulls data to be loaded into the empty container from a dynamic content provider. The dynamic content provider determines in real time a set of valid coupon offers for the user and transmits the set to the user in real-time for insertion into the empty container. The dynamic content provider may determine a rank for each of the set of the valid coupon offers, such that the rank is observed when the set of the coupon offers is inserted into the empty container.

20 Claims, 7 Drawing Sheets

TRANSMITTING VALID COUPON OFFERS TO AN EMAIL RECIPIENT

CROSS-REFERENCE TO RELATED APPLICATIONS; BENEFIT CLAIM

This application claims the benefit as a Continuation of application Ser. No. 14/788,385, filed Jun. 30, 2015, the entire contents of which is hereby incorporated by reference as if fully set forth herein, under 35 U.S.C. § 120. The applicants hereby rescind any disclaimer of claim scope in the parent applications or the prosecution history thereof and advise the USPTO that the claims in this application may be broader than any claim in the parent applications.

FIELD OF THE INVENTION

Embodiments of the present invention relate generally to software and marketing systems. More specifically, the present invention relates to a World Wide Web based electronic mail ("e-mail") software system that enables users to create text and hypertext markup language ("HTML") e-mail messages.

BACKGROUND OF THE INVENTION

In the sales and marketing industries, the ability to send e-mail messages about offers for goods and services such as coupons can greatly enhance the chances that the recipient will read the e-mail messages, and also enhances the chances that the individual will purchase the goods and services being advertised in the e-mail messages. If the offers included in the e-mail messages are expired or invalid, the recipient may become frustrated, and may even ignore future e-mail messages from the same company.

DESCRIPTION OF THE INVENTION

Figure 1:
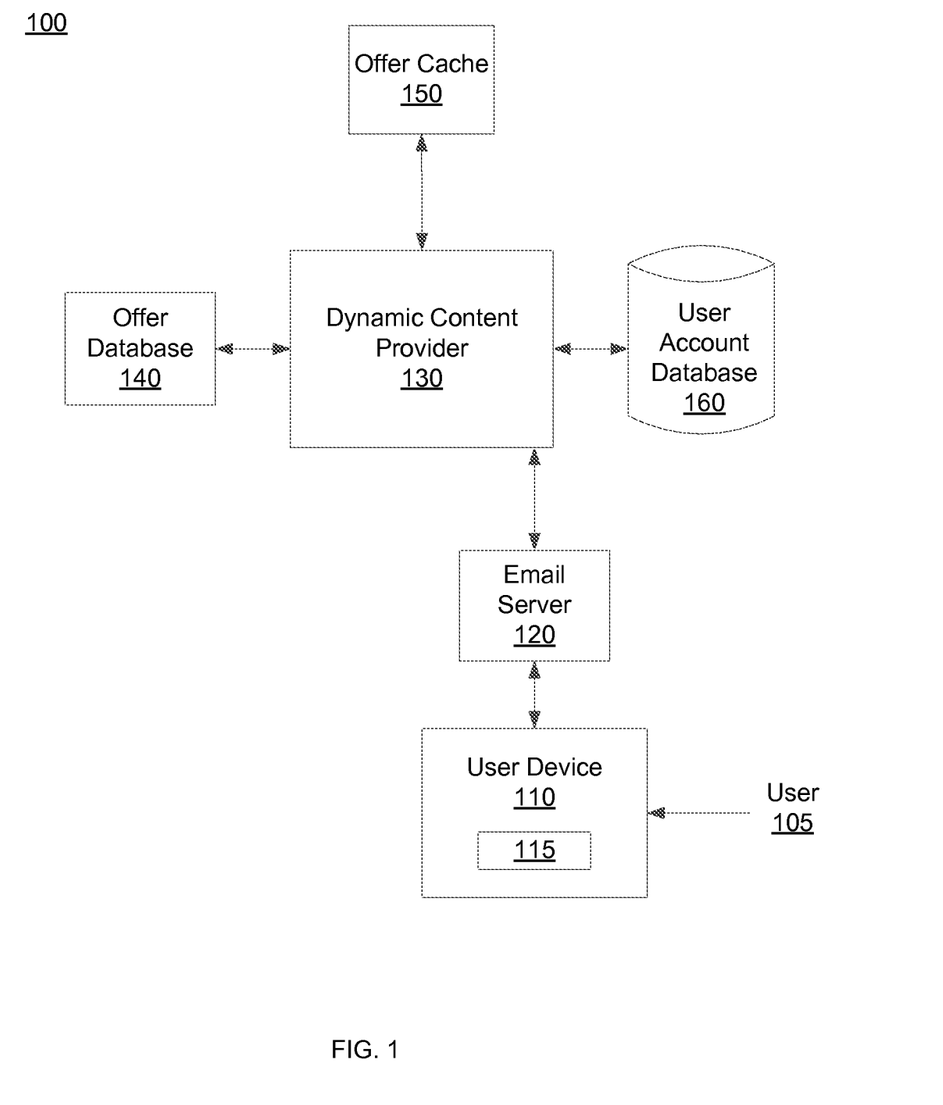
FIG. 1 shows a block diagram of the components of one embodiment of the system of the present invention.

Referring now to FIG. 1, there is shown one embodiment of the components of a dynamic content e-mail marketing system 100 according to the present invention. System 100 comprises a dynamic content provider 130, an email server 120, and user device 110. For purposes of clarity, only one email server 120 and one user device 110 shown in FIG. 1. However, it is within the scope of the present invention, and it will be appreciated by those of ordinary skill in the art, that the system of the present invention may have multiple email servers 120 and user devices 110 operating at the same time. In the embodiment shown in FIG. 1, user device 110 is operated by a recipient 105 of an email message via email server 120.

User device 110 includes a computer, computing device, or systems of a type well known in the art, such as a mainframe computer, workstation, personal computer, laptop computer, hand-held computer, cellular telephone, personal digital assistant, smartphone, tablet or any other device capable of receiving and rendering an email message. User device 110 accordingly comprises such software, hardware, and componentry as would occur to one of skill in the art, such as, for example, one or more microprocessors, memory systems, input/output devices, device controllers, and the like. User device 110 may comprise one or more data entry means (not shown in FIG. 1) operable by a user for user interface, such as, for example, a pointing device (such as a mouse), keyboard, touchscreen, microphone, voice recognition, and/or other data entry means known in the art. User device 100 may also comprise a display means (not shown in FIG. 1) which may comprise many of the well-known display means such as liquid crystal diode displays, light emitting diode displays, etc., upon which information may be displayed in a manner perceptible to the user 105.

User device 110 operated by the e-mail recipient is a software means 115 (also referred to as a software means 115) known in the art for retrieving e-mail messages from an e-mail mailbox including, but not limited to software means 115 for viewing e-mail messages, for composing a response to an e-mail message, and for deleting an e-mail message. Software means 115 may include a local email client, or a web-based email client, or a remotely accessed email client.

Dynamic content provider 130 comprises one or more server computers, computing devices, or systems of a type known in the art. Dynamic content provider 130 further comprises such software, hardware, and componentry as would occur to one of skill in the art, such as, for example, microprocessors, memory systems, input/output devices, device controllers, display systems, and the like. In FIG. 1, dynamic content provider 130 is shown and referred to herein as a single server. However, dynamic content provider 130 may comprise a plurality of servers or other computing devices or systems interconnected by hardware and software systems know in the art which collectively are operable to perform the functions allocated to host server in accordance with the present invention.

Offer database 140 is accessible to dynamic content provider 130, either remotely or locally and is used for storing coupon offers and associated coupon information. For each coupon offer stored in database 140, coupon information may include such information as a coupon identifier (e.g, a unique number that uniquely identifies the coupon), a coupon state (e.g, active, redeemed, expired, etc.), coupon terms, a coupon priority for distribution of coupon, and so on. For purposes of clarity, database 140 is shown in FIG. 1, and referred to herein as a single database. It will be appreciated by those of ordinary skill in the art that database 140 may comprise a plurality of databases connected by software systems of a type well known in the art, which collectively are operable to perform the functions delegated to database 140 according to the present invention. Database 140 may comprise a relational database architecture or other database architecture of a type known in the database art. Database 140 may comprise one of many well-known database management systems.

System 100 may further include an offer cache 150 for storing coupon offers that have been displayed to a recipient user 105. System 100 may further include a user account database 160 for storing records for a plurality of users, such as user 105. User database 160 is discussed further in reference to FIG. 6.

Although not illustrated in FIG. 1, dynamic content provider 130 may communicate with offer database 140 and/or offer cache 150 and/or user database 160 and/or email server 120 via one or more computer networks, such as an Ethernet network, cable-based network, satellite communications networks, well known in the art, and/or any combination of networks. Although not illustrated in FIG. 1, email server 120 may communicate with user device 110 via one or more computer networks, such as an Ethernet network, cable-based network, satellite communications networks, well known in the art, and/or any combination of networks.

Figure 2:
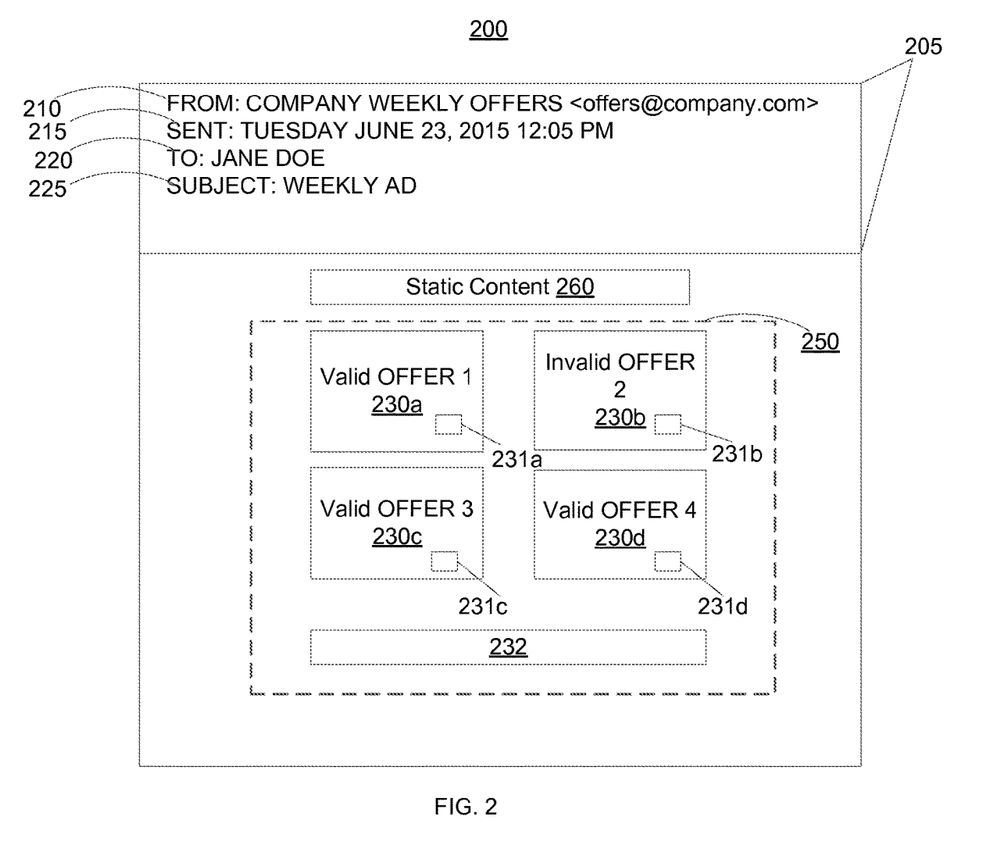
FIG. 2 illustrates an email message with dynamic offer content according to some embodiments of the present invention.

FIG. 2 is a plain view of an e-mail message 200 containing a plurality of dynamic coupon offers according to some embodiments. Coupon offers 230*a-d* are inserted into message 200 at a time when the recipient opens the email message. In this manner, only currently valid coupon offers are provided to the recipient of email message 200.

Message 200 in this example includes traditional header information 205, such as: (1) field 210 identifying the sender, (2) field 220 identifying the recipient, (3) field 225 listing the subject, and (4) field 215 listing a date and time of when the email was sent by email server 120. The email 200 contains a container 250 that is empty at a time that the email message is sent by email server 120 and only filled with content at the time the email message is opened by user 105 (discussed further with reference to FIG. 3). According to some embodiments, content in the container 250 includes a set of n dynamic coupon offers 230. In the example 200, four coupon offers 230*a-d* are illustrated. However, fewer or more coupon offers 230*a-d* may be included in email message 200. Content in container 250 (when loaded) may also include other elements, such as a user-selectable icon 232 that is selectable by the email recipient to perform an action with respect to the entire set of n dynamic coupon offers 230*a-d*. For e.g. icon 232 may be selected to clip or store the selected coupon offer to a recipient's account, such as to the recipient's loyalty account with a retailer. Content in container 250 (when loaded) may also include user-selectable icons 231 that is selectable by the email recipient to perform an action with respect to a particular one of the entire set of n dynamic coupon offers 230. For e.g. icon 231*a* may be selected by user 105 to clip or store the selected coupon offer 230*a* to a recipient's account, such as to the recipient's loyalty account with a retailer. In some embodiments (not illustrated), user-selectable icons 231 do not exist; rather an entire offer 230 is selectable by user 105. For example, by clicking/hovering/otherwise selecting anywhere on offer 230*a*, user 105 indicates selection of offer 230*a*.

Email message 200 may further include other static content 260 and footer information. For example, message 200 may include static coupons or offers that are guaranteed to be available to the user 105. An example of such a static coupon may be a basket size based coupon, such as "$10 off $50." Static content 260 may include other promotional content, such as a newsletter, blog, URLs, subscription information, information about user's loyalty account (e.g., points accrued), and so on. Unlike content in container 250, static content 260 is included in the email message 200 at the time the message 200 is sent by email server 120 to email client 110.

Figure 3:
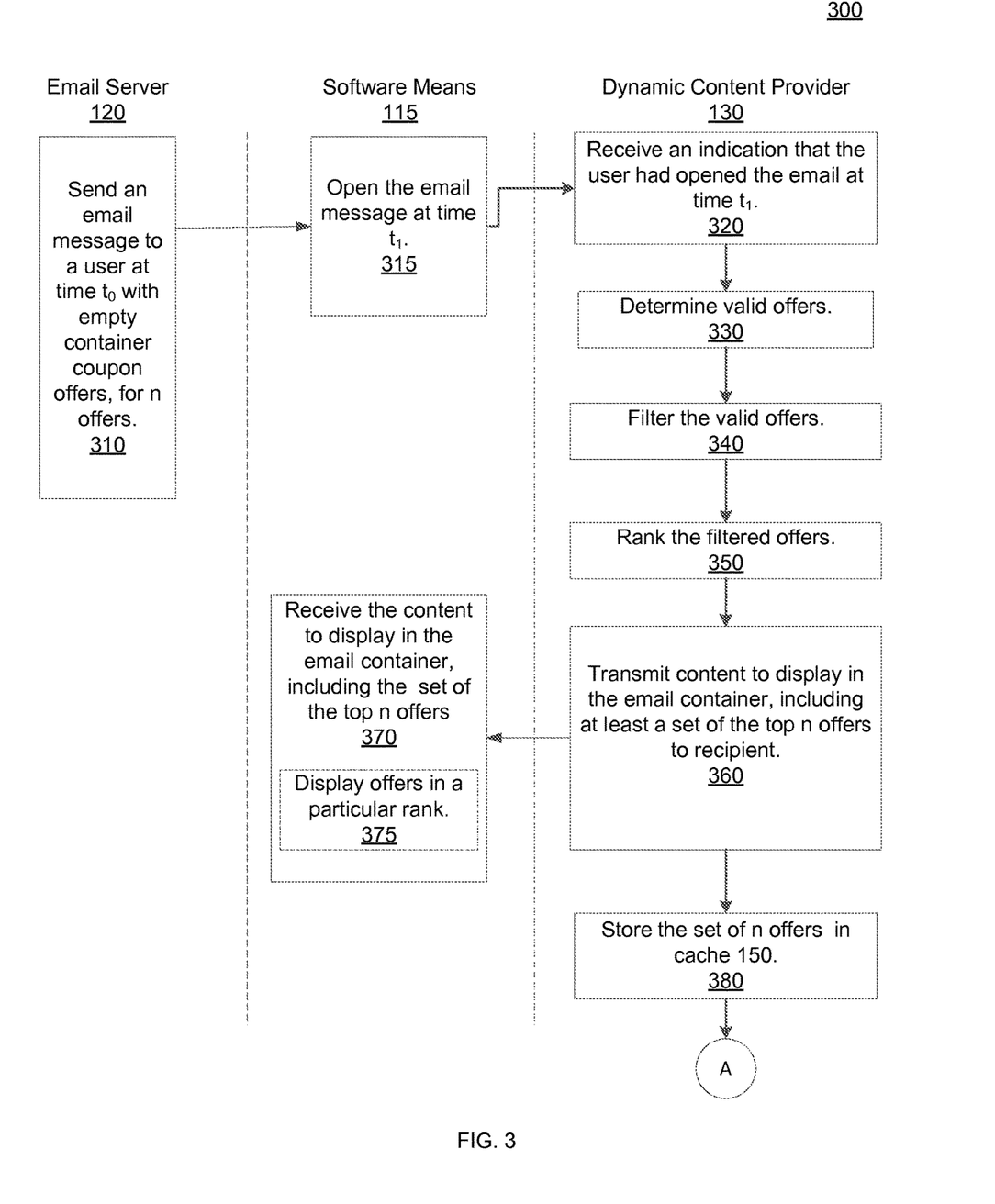
FIG. 3 depicts a flow diagram illustrating one embodiment of the method of sending an e-mail message with dynamic offer content according to the present invention.

FIG. 3 is a flow diagram 300 illustrating operation of system 100 for providing dynamic coupon offer content according to some embodiments.

At block 310, email server 120 sends an email message 200 intended for a recipient (e.g., recipient associated with email address 220) at time $t_0$. The recipient may be able to use software means 115 to receive the email message 200. Time $t_0$ may be included in the email message header information 205, e.g., in field 215. Email message 200, when sent by server 120, contains static content 260 (as described above with reference to FIG. 2). In some embodiments, when the email message 200 is sent at time $t_0$, it does not include any coupon offer content 230*a-d*. Instead, email message 200 includes an empty container 250, such that when the email message 200 is accessed by recipient 105 using software means 115, content has to be pulled from dynamic content provider 130 to be loaded into container 250. In some embodiments, email server 120 defines a layout for container 250. In some embodiments, email server 120 is associated with a retailer at which coupon content to be included in container 250 can be redeemed.

At block 315, a user 105 uses software means 115 to open the email message 200 at a time $t_1$ that is subsequent to time $t_0$. In response, software means 115 sends to dynamic content provider 130 an indication to provide content for container 250. The indication may further include such information as is necessary for dynamic content provider 130 to determine the identity of the recipient 105, such as user identification 220 (or a subset thereof) and/or loyalty account information for recipient 105 for a retailer associated with email server 120. The indication may further include layout information for container 250. The layout information may include such information as: how many (n) coupon offers are to be included in container 250, how the n coupon offers are to be displayed, size of then offers relative to other elements of email message 200, and so on. For example, for the email message 200, layout information may include: display 4 coupon offers in a table of size 2 by 2 and so on. The indication may further include information that may be used by dynamic content provider 130 to select the n coupon offers. Such selection information may include information about a coupon campaign.

At block 320, dynamic content provider 130 receives an indication in real-time that the recipient 105 of the email message 200 has opened the email message 200 at time $t_1$. This indication may be received in response to a pull from software means 115, which in turn may be generated when the software means 115 attempts to load content in the empty container 250 included in the email message 200.

At block 330, dynamic content provider 130 accesses coupon offer database 140 to determine a set of coupon offers that are currently valid, for example, using the selection information (e.g., coupon campaign information) received from software means 115. The set of coupon offers may include coupon offers that have not yet met associated redemption restrictions. Thus, the set include coupon offers whose expiration dates occur after current time, that have not yet met associated redemption quotas and so on.

At block 340, dynamic content provider 130 filters the set of valid coupon offers identified at block 330 based on one or more eligibility criteria to generate a subset of eligible coupon offers, for example, using the user identification information received from software means 115. In some embodiments, dynamic content provider 130 accesses a user account record for user 105 stored in user database 160 to obtain such information as may be necessary to apply the eligibility criteria, such as the user's address, location, demographic information, user preference information, loyalty account information, and so on.

One eligibility criterion may be geographic availability of product to which a coupon applies. Accordingly, if the product to which a coupon applies is not sold in the vicinity of the recipient 105, then the coupon is filtered out. Another eligibility criterion may be user demographics. Accordingly, if recipient 105 is of a certain age or gender, then the coupon may be filtered out. Another selection criterion may be user preference information. Accordingly, if recipient 105 has indicated a preference for not receiving coupons for certain category of products, those coupons may be filtered out. Another eligibility criterion may be user loyalty account information. Accordingly, the terms of a coupon require participation in a retailer's loyalty rewards program. If the recipient 105 does not meet the participation criteria, the coupon may be filtered out.

At block 350, dynamic content provider 130 ranks the subset of eligible coupon offers. In some embodiments, the subset of eligible coupon offers is ranked based on dynamic targeting of coupon offers to recipient 105. Accordingly, recipient's prior transaction history, as accessed from user database 160, may be used. The prior transaction history may include such information as previous coupons clipped (or stored to a loyalty account), previous coupons redeemed, previous products purchased, and so on. In other embodiments, the subset of eligible coupon offers is ranked based on additional criteria, such as coupon campaign rules or coupon priority data stored in offer database 140. For example, a particular coupon offer may be moved up in the ranking because the associated product needs to be sold aggressively (as indicated by a high coupon priority as stored in offer database 140).

At block 360, dynamic content provider 130 transmits a set of coupon offers including the top n coupon offers as determined at block 350 to software means 115 for insertion into the empty container of email message 200. In some embodiments, the dynamic content provider 130 transmits the top n coupon offers for insertion into the empty container 250 of email message 200 in an order based on the rank of the coupon offers. At block 360, dynamic content provider 130 also transmits other elements required to fill the container 250, such as user-selectable icon 232, user-selectable icons 231, etc.

At block 370, software means 115 receives the content to display in the email container 250, including the set of top n offers 230 and icon 232 from dynamic content provider 130. At block 375, optionally, software means 115 displays the received content such that an integrity of the container 250 is respected. Accordingly, if the empty container 250 has a defined layout of 4 cells with 2 rows, the top ranked offer may be rendered in the first cell formed by the first row and first column, the second ranked offer may be rendered in the cell formed by the first row and second column, and so on. Other elements of container 250 are also filled with appropriate content.

At block 380, the set of the top n offers 230 that have been rendered in the email message 200 are stored in offer cache 150. In some embodiments, an indication of rank of the n offers is also stored in offer cache 150. In some embodiments, dynamic content provider 130 also stores location information for each of the n offers in offer cache 150. For example, dynamic content provider 130 may store in offer cache 150, for offer 230a: information identifying user-selectable icon 231a (if provided), information identifying user-selectable icon 232, and/or co-ordinates of offer 230a with respect to container 250. Optionally, a user account record stored in user database 160 may also be updated to indicate that the set of the top n offers 230 that have been transmitted to the user 105.

Figure 4:
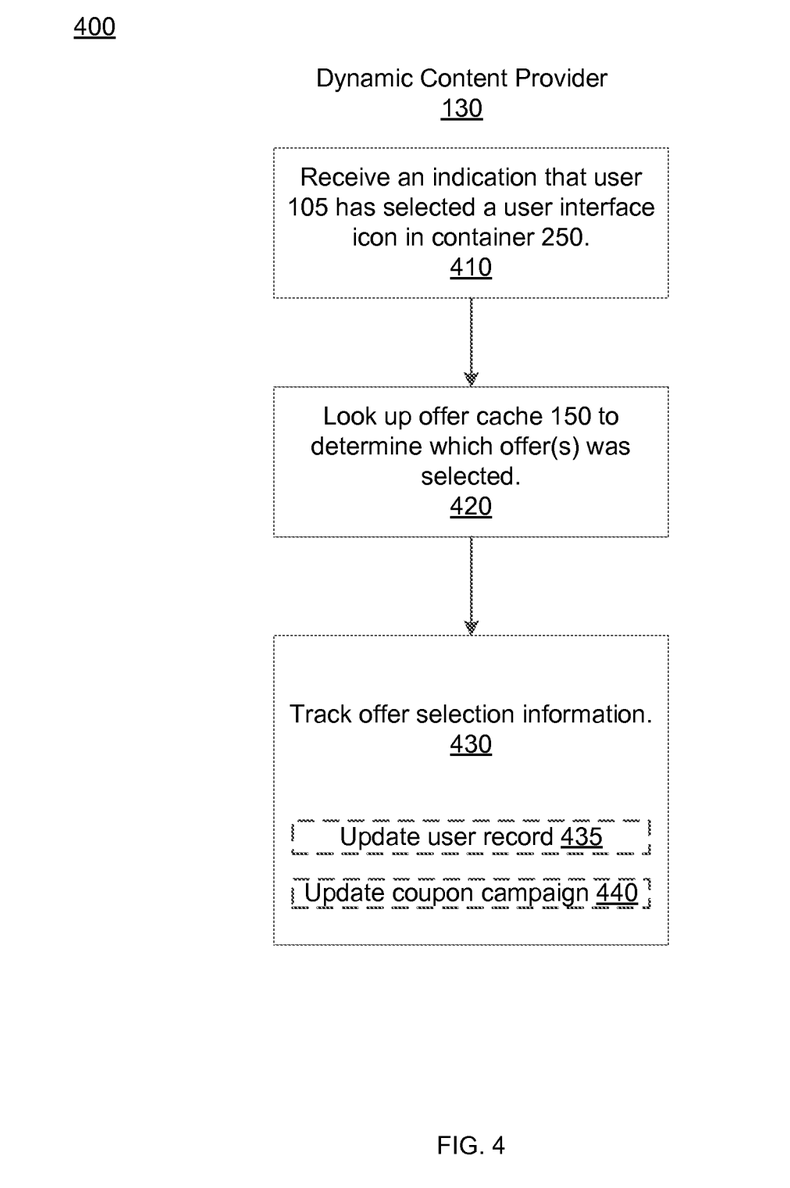
FIG. 4 depicts a flow diagram illustrating one embodiment of the method of sending an e-mail message with dynamic offer content according to the present invention.

FIG. 4 illustrates a flow diagram for a method 400 according to which dynamic content provider 130 tracks selection of one or more coupon offers 230 by user 105.

At block 410, dynamic content provider 130 receives an indication that user 105 has selected a user-selectable icon in container 250. Here, three possibilities exist: (1) user selects icon 232, thus indicating an action with respect to the entire set of n coupon offers 230, (2) user selects an icon 231, e.g., icon 231b, thus indicating an action with respect to a specific one of the entire set of n coupon offers 230 (here offer 230b), or (3) user indicates an action with respect to a specific one (e.g., offer 230b) of the entire set of n coupon offers 230 by clicking/hovering/otherwise selecting anywhere on offer 230b if icon 231b is not provided. With respect to the third possibility, dynamic content provider 130 receives an indication that the user has selected a coupon in a particular location (e.g., x-y coordinates) in container 250.

At block 420, dynamic content provider 130 uses information received at block 410 to lookup offer cache 150 in order to determine which offer(s) was selected.

At block 430, dynamic content provider 130 tracks offer selection information. In some embodiments, dynamic content provider 130 updates user record 600 to indicate which offer(s) was selected (at block 435). In some embodiments, dynamic content provider 130 updates coupon campaign information (at block 440), e.g., as stored in offer database 140, e.g., to mark a selected offer(s) as clipped, stored, etc.

Figure 5A:
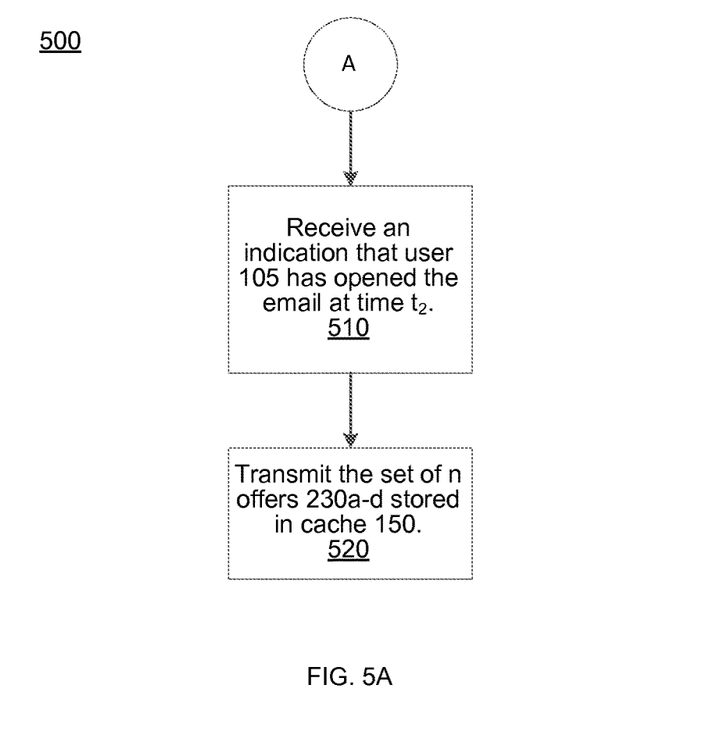
FIGS. 5A and 5B depict flow diagrams for alternate methods of rendering dynamic offer content for when a user opens an email message for a second time according to some embodiments of the present invention.
Figure 5B:
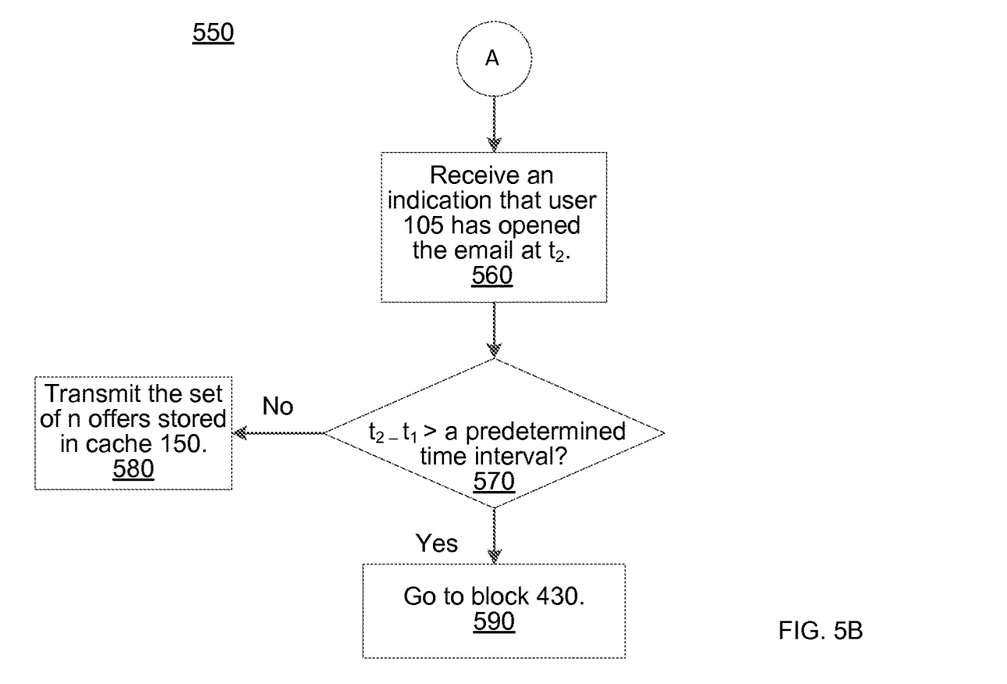

FIGS. 5A and 5B depict flow diagrams for alternate methods of rendering dynamic offer content for when a user opens an email message for a second time according to some embodiments of the present invention.

In the method 500 depicted in FIG. 5A, the same set of top n offers 230 is rendered in the container of email message 200 when the user 105 opens the email message 200 at a later time $t_2$ subsequent to time $t_1$. Note that this is the same email message 200 previously sent by dynamic content provider 130 to recipient at time $t_0$ and previously opened by recipient 105 at time $t_1$.

At block 510, dynamic content provider 130 receives an indication in real-time that the recipient 105 of the email message 200 has opened the email message 200 at time $t_2$. This indication may be received in response to a pull from software means 115, which in turn may be generated when the software means 115 attempts to load content in the empty container 250 included in the email message 200.

At block 520, dynamic content provider 130 communicates with offer cache 150 to access the set of the top n offers 230 cached at block 370 for email message 200. Dynamic content provider 130 transmits the same set to email server 120 for serving up to user 105. In this way, a user opening the same email message 200 for a second (or subsequent) time will see the same set of n offers 230 that the user saw the first time around. In some embodiments, the previously determined rank (at block 350 and as stored in offer cache 150) associated with each of the set of the top n offers 230 is also used so that the user sees the same set of n offers 230 in the same ordering as seen previously.

In the alternate method 550 depicted in FIG. 5B, a slightly different method is used in determining the set of n top offers 230 to render to user 105 when the user 105 opens email message 200 for a second (or subsequent) time at time $t_2$.

At block 560, dynamic content provider 130 receives an indication in real-time that the recipient 105 of the email message 200 has opened the email message 200 at time $t_2$. This indication may be received in response to a pull from software means 115, which in turn may be generated when the software means 115 attempts to load content in the empty container 250 included in the email message 200.

At block 570, dynamic content provider 130 determines whether too much time has passed between the times that the user 105 has opened the same email message 200. If the difference between $t_2$ and $t_1$ does not exceed a certain predetermined threshold, then at block 580, the method 550 goes to block 520 (FIG. 5A). Accordingly, a user opening the same email message for a second (or subsequent) time will see the same set of n offers 230a-d that the user saw the first time around. If however, the difference between $t_2$ and $t_1$ exceeds a certain predetermined threshold, then at block 580, the method 550 goes to block 330 (FIG. 3). Accordingly, a set of top n offers 230a-d is determined in real-time at time $t_2$ and served to user 105. In this way, updates in user's transaction history, preference data, coupon campaign, etc., can be incorporated in the determination of which coupon offers to serve.

In some embodiments, the predetermined threshold may be equal to a frequency of email messages sent by the sender to the recipient. For example, if email messages 200 are sent to the recipient 105 on a weekly basis, then at block 570, the dynamic content provider 130 calculates whether the difference between $t_2$ (time of second or subsequent access to email message 200) and $t_1$ (time of first or initial access) exceeds a week.

Figure 6:
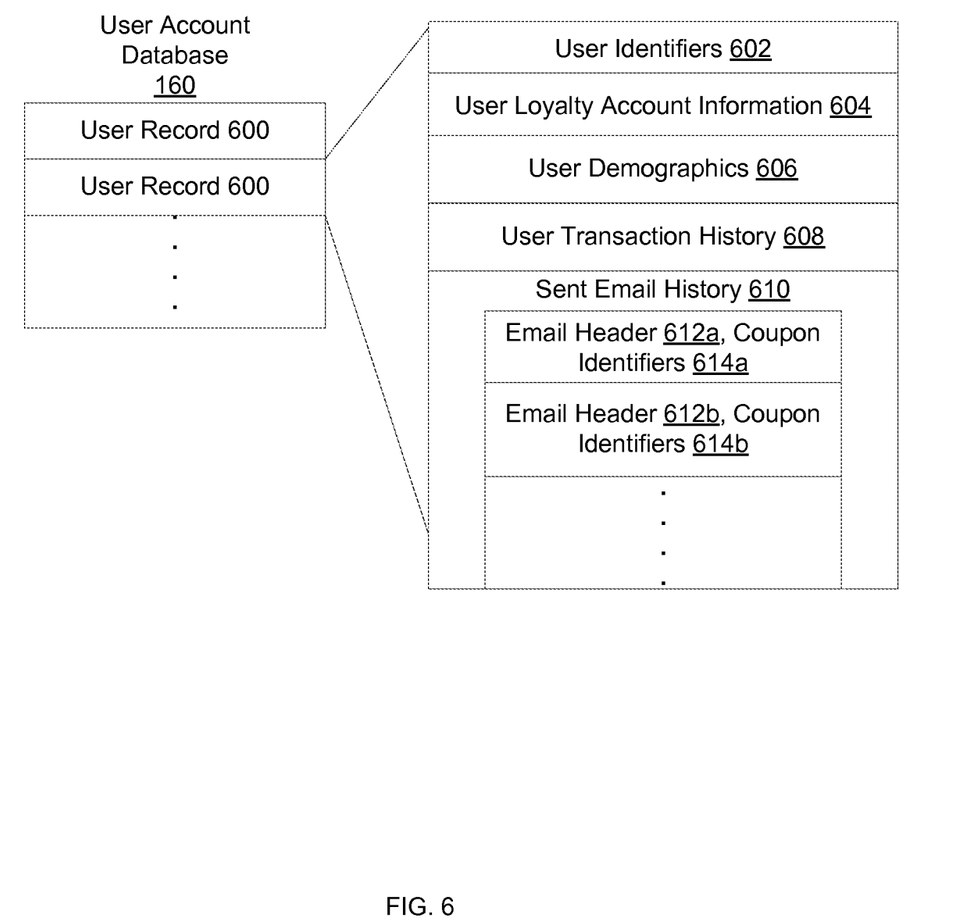
FIG. 6 illustrates a data structure for a user database according to some embodiments of the present invention.

FIG. 6 is an exemplary user record 600 in user information database 160 (FIG. 1) in accordance with one embodiment of the invention. In some embodiments, user record 600 contains a subset or a superset of the elements depicted in FIG. 6. A respective user account record 600 may include such information as: (i) one or more user account identifiers 602 which associates certain information in user information database 160 to a particular user or user identifier (e.g., user's login user name associated with a social networking site, user's email address, user's account user name associated with an online merchant, etc.) and/or to a particular user device 110, (ii) user loyalty account information 604, such as user's loyalty card number and account information associated with one or more retailers, (iii) user demographical, biographical and geographical information 606, such as may be used to determine user eligibility for clipping coupon offers (at block 340), (iv) user transaction history 608 (e.g., data derived from monitoring a user's queries, click results, coupon clicks, digital coupons clipped, coupons redeemed, purchase history, etc.), such as may be used to target coupon offers (at block 350) and/or to rank coupon offers (at block 360), (v) records 610 of email messages (e.g., message 200) sent to user, such as email header information 612 for each email message sent and identifiers 614 for n coupon offers rendered in each message, and so on. In an embodiment, the digital coupons rendered to a user 105 (e.g., at block 360) are unique instances of corresponding offers, wherein each unique instance has a unique coupon identifier 614. Accordingly, email history data 610 may store unique coupon information 614 for digital coupons rendered in a corresponding email messages.

In some embodiments, an account identifier 602 includes a series of characters and/or symbols that uniquely identifies a consumer or a consumer account associated with the consumer. In an embodiment, account identifier 602 is a number for a card account, such as a credit card account or consumer loyalty card account. In an embodiment, account identifier 602 is a unique device identifier belonging to a portable computing device. Examples include a mobile phone, laptop or netbook computer, tablet computer, personal digital assistant, flash drive, music player, or camera. For example, the device identifier may be a MAC address, Bluetooth address, serial number, randomly assigned number, and so forth. In an embodiment, identifier 602 does not necessarily correspond to device hardware, but may rather be provided by a software application executing on the device. In an embodiment, account identifier 602 may be associated with biometric data that uniquely identifies consumer, such as a fingerprint or a retinal scan.

Figure 7:
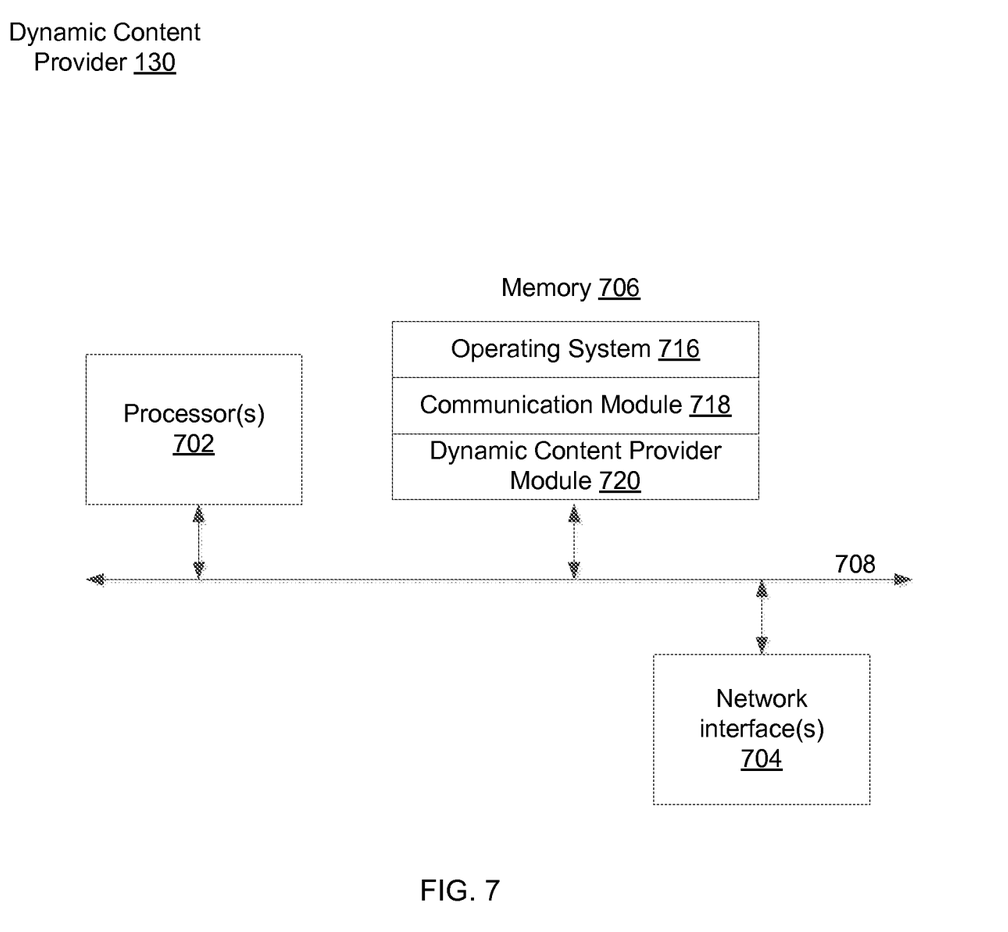
FIG. 7 illustrates an embodiment of the dynamic content provider.

Referring to FIG. 7, an embodiment of a dynamic content provider 130 that implements the methods described above includes one or more processing units (CPU's) 702, one or more network or other communications interfaces 704, memory 706, and one or more communication buses 708 for interconnecting these components. The dynamic content provider 130 may optionally include a user interface comprising a display device and a keyboard. Memory 706 (which may comprise or include a computer readable storage medium) may include high speed random access memory and may also include non-volatile memory, such as one or more magnetic or optical storage disks. Memory 706 may include mass storage that is remotely located from CPU's 702. The Memory 706 may store:

an operating system 716 that includes procedures for handling various basic system services and for performing hardware dependent tasks;

a network communication module (or instructions) 718 that is used for connecting the dynamic content provider 130 to other computers via the one or more communications network interfaces 704 (wired or wireless), such as the Internet, other wide area networks, local area networks, metropolitan area networks, and so on; and a dynamic content provider module 720 for providing dynamic coupon content for insertion into email messages in accordance with one or more of the embodiments described with reference to FIGS. 3, 4, 5A and 5B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method executed using a server computer, the method comprising:

receiving in real-time, from an email client, an indication that an email message was opened at a first time, wherein the email message was sent by an email server to a user account at a previous time;

determining in real-time a set of valid coupon offers for the user account among a plurality of user accounts;

transmitting the set of valid coupon offers in real time to the user account for insertion into the email message;

receiving an indication that the email message was opened at a second time subsequent to the first time;

determining if a difference between the second time and the first time exceeds a predetermined threshold; and if the difference between the second time and the first time exceeds the predetermined threshold:
　　determining in real-time and based on an update to transaction history or preference data associated with the user account, a second set of valid coupon offers for the user account, and
　　transmitting in real-time, the second set of valid coupon offers to the user account for insertion into the email message.

2. The method of claim 1, wherein the transaction history associated with the user account includes one or more of: coupons stored to a loyalty account associated with the user, coupons redeemed by the user, and products purchased by the user account.

3. The method of claim 1, wherein the preference data associated with the user account includes a preference for not receiving coupons for certain category of products.

4. The method of claim 1, wherein determining the set of valid coupon offers comprises:
　　filtering a superset of valid coupon offers based at least on user eligibility criteria to determine the set of valid coupon offers.

5. The method of claim 4, further comprising:
　　receiving, with the indication that the email message was opened at the first time, identification information for the user account; and
　　using the identification information to perform a lookup of a user account database in order to determine the user eligibility criteria.

6. The method of claim 4, wherein determining the set of valid coupon offers comprises:
　　filtering the superset of valid coupon offers based at least on coupon campaign criteria to determine the set of valid coupon offers.

7. The method of claim 6, further comprising:
　　receiving, with the indication that the email message was opened at the first time, identification information for a coupon campaign; and
　　using the identification information for the coupon campaign to perform a lookup of a coupon offer database in order to determine the coupon campaign criteria.

8. The method of claim 1, wherein transmitting in real-time, the set of valid coupon offers to the user account for insertion into the email message comprises storing the set of the valid coupon offers in an offer cache.

9. The method of claim 8, further comprising:
　　determining that at least one valid coupon offer of the set of the valid coupon offers has been selected, by performing a lookup of the offer cache.

10. The method of claim 8, further comprising:
　　receiving an indication that the email message was opened at a second time subsequent to the first time;
　　performing a lookup of the offer cache to determine the set of valid coupon offers transmitted to the user account; and
　　transmitting the set of valid coupon offers to the user account for insertion into the email message.

11. One or more non-transitory computer-readable media storing instructions which, when executed by one or more processors, cause:
　　receiving in real-time, from an email client, an indication that a user has opened an email receiving in real-time, from an email client, an indication that an email message was opened at a first time, wherein the email message was sent by an email server to a user account at a previous time;
　　determining in real-time a set of valid coupon offers for the user account among a plurality of user accounts;
　　transmitting the set of valid coupon offers in real time to the user account for insertion into the email message;
　　receiving an indication that the email message was opened at a second time subsequent to the first time;
　　determining if a difference between the second time and the first time exceeds a predetermined threshold; and if the difference between the second time and the first time exceeds the predetermined threshold:
　　　　determining in real-time and based on an update to transaction history or preference data associated with the user account, a second set of valid coupon offers for the user account, and
　　　　transmitting in real-time, the second set of valid coupon offers to the user account for insertion into the email message.

12. The one or more non-transitory computer-readable media of claim 11, wherein the transaction history associated with the user account includes one or more of: coupons stored to a loyalty account associated with the user, coupons redeemed by the user, and products purchased by the user account.

13. The one or more non-transitory computer-readable media of claim 11, wherein the preference data associated with the user account includes a preference for not receiving coupons for certain category of products.

14. The one or more non-transitory computer-readable media of claim 11, wherein determining the set of valid coupon offers comprises:
　　filtering a superset of valid coupon offers based at least on user eligibility criteria to determine the set of valid coupon offers.

15. The one or more non-transitory computer-readable media of claim 14, further comprising instructions which, when executed by the one or more processors, cause:
　　receiving, with the indication that the email message was opened at the first time, identification information for the user account; and
　　using the identification information to perform a lookup of a user account database in order to determine the user eligibility criteria.

16. The one or more non-transitory computer-readable media of claim 14, wherein determining the set of valid coupon offers comprises:
　　filtering the superset of valid coupon offers based at least on coupon campaign criteria to determine the set of valid coupon offers.

17. The one or more non-transitory computer-readable media of claim 16, further comprising instructions which, when executed by the one or more processors, cause:
　　receiving, with the indication that the email message was opened at the first time, identification information for a coupon campaign; and
　　using the identification information for the coupon campaign to perform a lookup of a coupon offer database in order to determine the coupon campaign criteria.

18. The one or more non-transitory computer-readable media of claim 11, wherein transmitting in real-time, the set of valid coupon offers to the user account for insertion into the email message comprises storing the set of the valid coupon offers in an offer cache.

19. The one or more non-transitory computer-readable media of claim 18, further comprising instructions which, when executed by the one or more processors, cause:

determining that at least one valid coupon offer of the set of the valid coupon offers has been selected, by performing a lookup of the offer cache.

20. The one or more non-transitory computer-readable media of claim 18, further comprising instructions which, when executed by the one or more processors, cause:
receiving an indication that the email message was opened at a second time subsequent to the first time;
performing a lookup of the offer cache to determine the set of valid coupon offers transmitted to the user account; and
transmitting the set of valid coupon offers to the user account for insertion into the email message.

\* \* \* \* \*